(12) United States Patent
Iijima

(10) Patent No.: US 9,193,918 B2
(45) Date of Patent: Nov. 24, 2015

(54) METHOD FOR GENERATING ELECTRICITY AND FOR PRODUCING GASOLINE FROM METHANOL AND SYSTEM THEREFOR

(75) Inventor: Masaki Iijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 283 days.

(21) Appl. No.: 13/547,272

(22) Filed: Jul. 12, 2012

(65) Prior Publication Data

US 2013/0014430 A1    Jan. 17, 2013

(30) Foreign Application Priority Data

Jul. 15, 2011    (JP) .................................. 2011-156647

(51) Int. Cl.
| | | |
|---|---|---|
| C10L 1/04 | (2006.01) | |
| B01J 8/00 | (2006.01) | |
| F01K 13/00 | (2006.01) | |
| F01D 15/10 | (2006.01) | |
| C10G 3/00 | (2006.01) | |
| C10L 1/06 | (2006.01) | |

(52) U.S. Cl.
CPC .. *C10G 3/42* (2013.01); *C10G 3/49* (2013.01); *C10L 1/06* (2013.01); *C10G 2300/805* (2013.01); *C10G 2400/02* (2013.01)

(58) Field of Classification Search
USPC .................. 290/52; 422/187; 44/300; 60/645
See application file for complete search history.

(56) References Cited

U.S. PATENT DOCUMENTS

| | | | |
|---|---|---|---|
| 3,894,103 A | 7/1975 | Chang et al. |
| 3,906,054 A | 9/1975 | Kaeding et al. |
| 4,263,141 A | 4/1981 | Moller et al. |
| 4,338,475 A | 7/1982 | Pennington et al. |

FOREIGN PATENT DOCUMENTS

| | | |
|---|---|---|
| CN | 101712884 A | 5/2010 |
| EP | 0 103 914 A2 | 3/1984 |
| EP | 0 108 482 A1 | 5/1984 |
| JP | 50-076027 A | 6/1975 |
| JP | 51-057688 A | 5/1976 |
| JP | 57-14685 A | 1/1982 |
| JP | 10-506668 A | 6/1998 |
| JP | 2006-138288 A | 6/2006 |
| JP | 2009-286758 A | 12/2009 |

(Continued)

OTHER PUBLICATIONS

Extended European Search Report dated Oct. 17, 2012, issued in corresponding European patent application 12175081.4.

(Continued)

*Primary Examiner* — Cephia D Toomer
*Assistant Examiner* — Chantel Graham
(74) *Attorney, Agent, or Firm* — Westerman, Hattori, Daniels & Adrian, LLP

(57) ABSTRACT

A method for generating electric power and for producing gasoline from methanol, includes the steps of: synthesizing gasoline by reacting methanol under a catalyst; recovering heat generated from the gasoline synthetic reaction of methanol by cooling the reaction with coolant to vaporize the coolant; and generating electric power by using the coolant vapor produced in the heat recovery. The power generation step may include generating electric power with a plurality of steam turbines in series, e.g., a high-pressure turbine, a medium-pressure turbine, and a low-pressure turbine.

2 Claims, 3 Drawing Sheets

(56) References Cited

FOREIGN PATENT DOCUMENTS

| | | |
|---|---|---|
| JP | 2010-512435 A | 4/2010 |
| WO | 96/15082 A1 | 5/1996 |
| WO | 2007/114250 A1 | 10/2007 |
| WO | 2008/073186 A2 | 6/2008 |
| WO | 2011/033559 A1 | 3/2011 |

OTHER PUBLICATIONS

Japanese Office Action mailed Nov. 21, 2014, issued in corresponding JP Patent Application No. 2011-156647 with English translation (6 pages).

Notice of Allowance dated Jul. 31, 2015, issued in counterpart Japanese Patent Application No. 2011-156647 w/ English translation (6 pages).

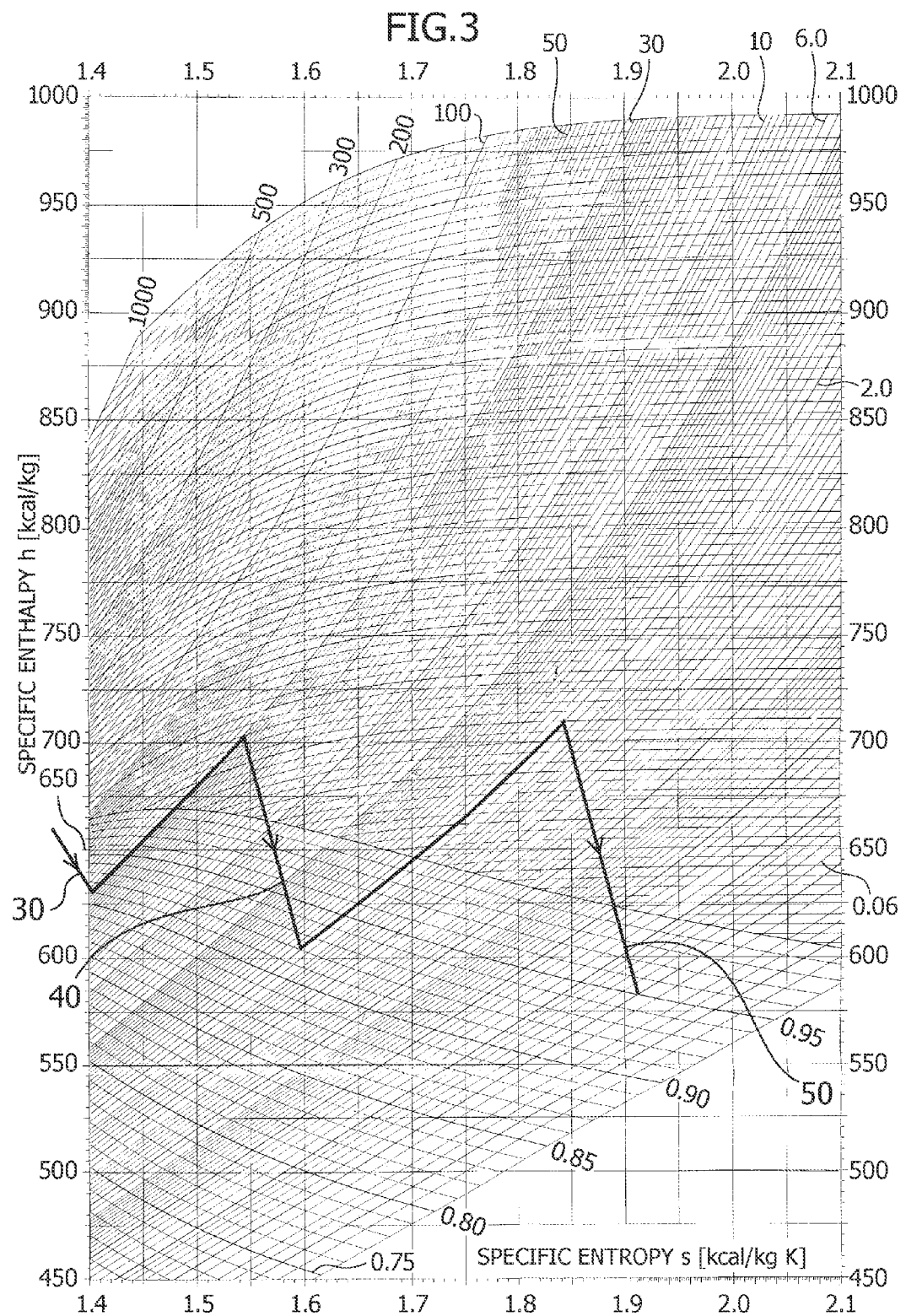

METHOD FOR GENERATING ELECTRICITY AND FOR PRODUCING GASOLINE FROM METHANOL AND SYSTEM THEREFOR

CROSS-REFERENCE TO RELATED APPLICATION

This Application claims priority from Japanese Patent Application No. 2011-156647 filed on Jul. 15, 2011, which is incorporated herein by reference in its entirety.

BACKGROUND OF THE INVENTION

The present invention relates to a method for generating electric power and for producing gasoline from methanol, and to a system therefor.

A catalyst for converting methanol to dimethyl ether (DME) or for converting methanol to gasoline through DME was already known (e.g., Japanese Patent Application Publication No. 50-076027 and Japanese Patent Application Publication No. 51-057688). A synthetic reaction for synthesizing DME or gasoline from methanol using this catalyst needs to be executed at as high a temperature as about 400° C., and because this reaction is an exothermic reaction, it is necessary to continuously cool the reactor in order to maintain the reactor within a predetermined temperature range.

In addition, Japanese Patent Application Publication No. 10-506668 discloses that reactors having the catalyst for converting methanol to gasoline are provided on a plurality of stages, and by mixing methanol and dilution gas with emission gas product discharged from a reactor on a first stage, mixed gas is generated. Then, the temperature and components of the dilution gas are adjusted to bring the mixed gas into a predetermined temperature range, and this mixed gas is supplied to a reactor on a second stage in order to obtain new emission gas product.

SUMMARY OF THE INVENTION

However, the method described in Japanese Patent Application Publication No. 10-506668 has the following problems: an apparatus for producing gasoline from methanol can become complicated in configuration and increase in scale; and an operation cost for maintaining the reactor within a predetermined temperature range can rise.

Accordingly, in view of the above-described problems, an object of the present invention is to provide a method for producing gasoline from methanol with generation of electric power, in which, by cooling heat generated due to gasoline synthesis reaction of methanol, electric power is generated, thereby reducing total cost, and a system for the method.

To achieve the above-described object, according to an embodiment of the present invention, there is provided a method for generating electric power and for producing gasoline from methanol, the method including the steps of: synthesizing gasoline by reacting methanol under a catalyst; recovering heat generated from the gasoline synthetic reaction of methanol by cooling the reaction with coolant to vaporize the coolant; and generating electric power by using the coolant vapor produced in the heat recovery.

The coolant may include water. The coolant vapor may include saturated water vapor. The power generation step may include generating electric power with at least one steam turbine using the saturated water vapor. Furthermore, the power generation step may include generating electric power with a plurality of steam turbines in series, further comprising: generating electric power with a first steam turbine of the plural steam turbines using a part of the saturated water vapor; superheating exhaust steam from the first steam turbine by another part of the saturated water vapor; and generating electric power with a second steam turbine of the plural steam turbines using the superheated exhaust steam.

According to another aspect of the present invention, there is provided a system for generating electric power and for producing gasoline from methanol, the system including: a gasoline production apparatus containing a catalyst for synthesizing gasoline from methanol, heat generated by the synthesis increasing a temperature of the gasoline production apparatus; a cooling apparatus for cooling the gasoline production apparatus with coolant to vaporize the coolant; and a power generation apparatus for generating electric power using the coolant vapor produced by the cooling apparatus.

The coolant may include water. The vapor may include saturated water vapor. The power generation apparatus may include at least one steam turbine. Furthermore, the power generation apparatus may include a plurality of steam turbines, the system further including: a line for supplying a part of the saturated water vapor to a first steam turbine of the plurality of steam turbines; a line for supplying exhaust steam from the first steam turbine to a second steam turbine of the plurality of steam turbines; and a superheater for superheating the exhaust steam of the second steam turbine using another part of the saturated water vapor.

According to the present invention, because heat generated by gasoline synthetic reaction of methanol is cooled with coolant and this reaction occurs at about 400° C., when the coolant is water, it is possible to obtain water vapor of about 100 kg/cm$^2$G (saturated at 310° C.). Such vapor enables power generation to be achieved sufficiently and consequently, apparatus cost and operating cost required for the cooling can be transformed to power generation cost. Thus, the system and method which can be expected to ensure a sufficient profit in terms of the total cost for gasoline production and power generation can be provided.

BRIEF DESCRIPTION OF THE DRAWINGS

FIG. 3 is an h-s diagram for steam showing changes in enthalpy and entropy of steam in the system according to the present invention.

DETAILED DESCRIPTION OF THE PREFERRED EMBODIMENT

Figure 1:
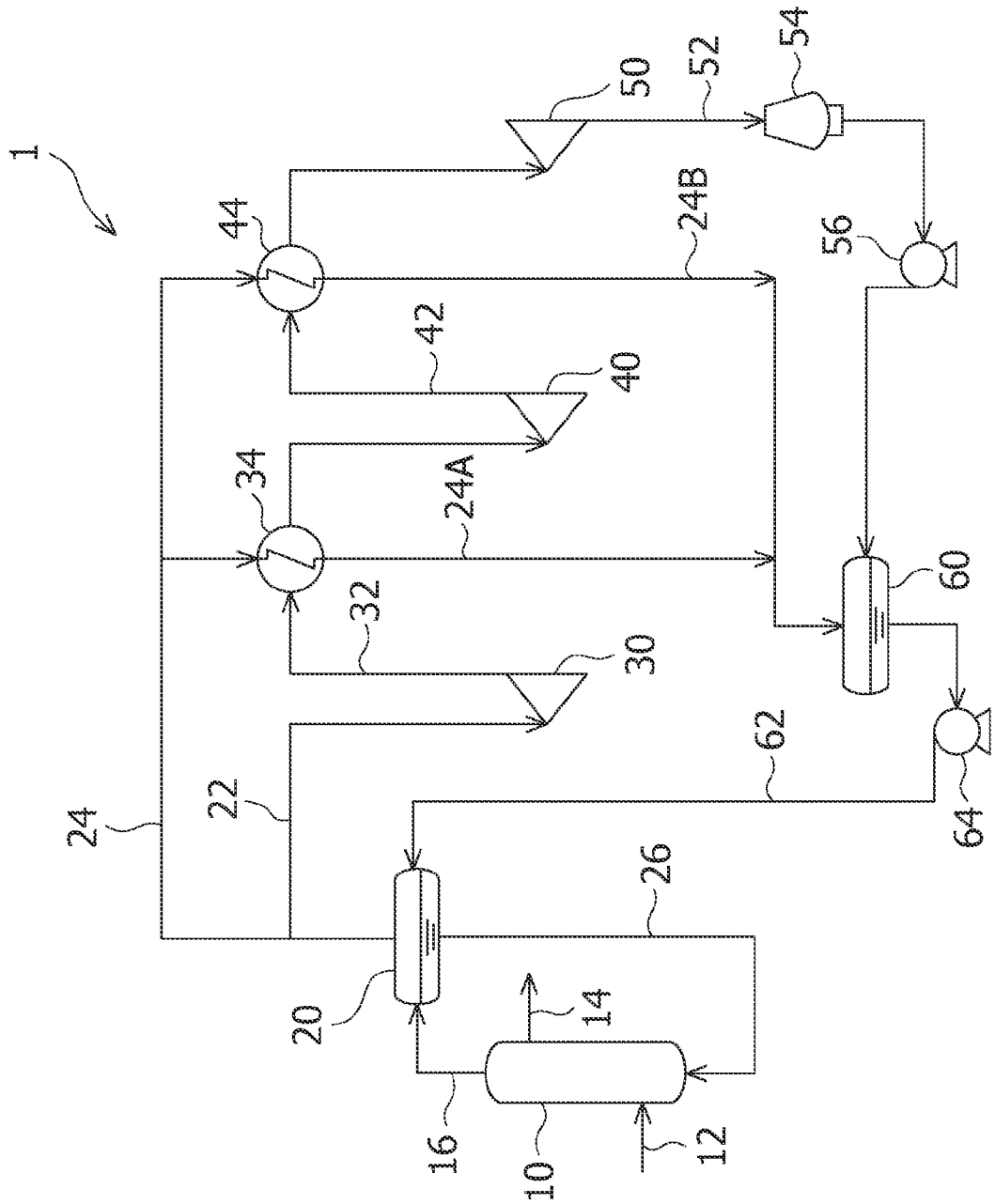
FIG. 1 is a schematic view showing an embodiment of a system for generating electric power and for producing gasoline according to the present invention.

Hereinafter, an embodiment of the present invention will be described with reference to the accompanying drawings. As shown in FIG. 1, a gasoline production power generation system 1 of the present embodiment includes mainly a reactor 10 for synthesizing gasoline from methanol, and a series of turbines for generating electric power with water vapor used for cooling the reactor, namely, a high-pressure turbine 30, a medium-pressure turbine 40, and a low-pressure turbine 50.

The reactor 10 synthesizes gasoline from methanol which is a raw material, through reactions shown in the following formulas.

  (formula 1)

  (formula 2)

In this way, methanol is converted to gasoline through a dimethyl ether (DME) synthetic reaction shown in formula 1 and a gasoline synthetic reaction shown in formula 2. In the reactor 10, two kinds of the catalysts, i.e., DME synthetic catalyst and gasoline synthetic catalyst are provided on two stages, so that the two reactions can be progressed in stages. The reactor 10 includes a catalyst layer (not shown) which is filled with these catalysts, and methanol or DME passes through this catalyst layer. As the DME synthetic catalyst, it is permissible to use known catalysts, for example, aluminosilicate type zeolite base catalyst. As the gasoline synthetic catalyst, the known catalysts such as the aluminosilicate type zeolite base catalyst may also be used. These catalysts have been disclosed in detail in Japanese Patent Application Publication No. 50-076027 and Japanese Patent Application Publication No. 51-057688, which are incorporated herein by reference in their entirety.

The synthetic reaction from methanol to DME is an exothermic reaction and a reaction heat thereof is 185 kcal per methanol of 1 kg. The gasoline synthetic reaction is also an exothermic reaction and a reaction heat thereof is 231 kcal per methanol of 1 kg. Thus, when synthesizing gasoline from methanol, a reaction heat thereof is 416 kcal per methanol of 1 kg. Electric power is generated using this reaction heat. As the condition for DME synthetic reaction, a pressure in a range of 35 to 45 kg/cm$^2$ is preferred and a temperature in a range of 250 to 300° C. is preferred. As the condition for gasoline synthetic reaction, a pressure in a range of 3 to 8 kg/cm$^2$ is preferred and a temperature in a range of 380 to 450° is preferred.

The reactor 10 includes a methanol supply line 12 for supplying methanol to the reactor and a gasoline discharge line 14 for discharging gasoline synthesized by the reactor. The reactor 10 is cooled by coolant to control the temperature of the reactor within the above-described range. The reactor 10 is provided with a flow path (not shown) in which coolant flows along an outer periphery of the catalyst layer (not shown). Although the coolant is not restricted to any particular type as long as it is capable of cooling the reactor 10 within the above-mentioned temperature range, water is preferred. Thus, this system 1 includes a coolant discharge line 16 for discharging water vapor used for cooling the reactor from the reactor, a steam-water separator 20 for separating water vapor used for cooling, and a coolant circulation line 26 for supplying water separated by the steam-water separator to the reactor again.

This system 1 includes a power generation water vapor line 22 for supplying saturated water vapor separated by the steam-water separator 10 in order to generate electric power with water vapor used for cooling the reactor, a power generation water vapor line 32 for supplying water vapor used for power generation in the high-pressure turbine 30 to the medium-pressure turbine 40, and a power generation water vapor line 42 for supplying water vapor used for power generation in the medium-pressure turbine 40, to the low-pressure turbine 50. Superheaters 34, 44 for superheating water vapor whose pressure has been lowered due to the power generation in the turbines are arranged in the power generation water vapor line 32 and the power generation water vapor line 42, which are located between the turbines. The superheaters 34, 44 are provided with superheating water vapor lines 24A, 24B for supplying water vapor having a high temperature in parallel to each other from the steam-water separator 20.

This system 1 is provided with a water vapor collection line 52 for collecting water vapor from the low-pressure turbine in order to use the water vapor used for power generation in the low-pressure turbine 50 as coolant again. This vapor collection line 52 includes a condenser 54 for condensing water vapor. Further, this system 1 includes a condenser 60 for condensing and collecting the water vapor, which has undergone heat exchange by the superheaters 34, 44. Then, this system 1 includes a coolant collection line 62 for carrying the coolant condensed by the condenser 54 and the coolant existing within the condenser 60, to the steam-water separator 20. In the meantime, the vapor collection line 52 and the coolant collection line 62 have pumps 56, 64, respectively.

In this system 1 having the above configuration, first, methanol, which is a raw material, is supplied to the reactor 10 through a methanol supply line 12. The reactor 10 induces DME synthetic reaction and gasoline synthetic reaction under a predetermined temperature and pressure to synthesize gasoline through the DME. Gasoline is discharged through the gasoline discharge line 14 and carried to a storage facility (not shown). Because both the DME synthetic reaction and the gasoline synthetic reaction are exothermic reactions, the reactor 10 is cooled with water as coolant in order to keep the reactor at a predetermined temperature. Consequently, the coolant turns to supersaturated water vapor, which is carried to the steam-water separator 20 through the coolant discharge line 16.

The steam-water separator 20 separates the supersaturated steam to saturated water vapor and water, and the water is carried to the reactor 10 through the coolant circulation line 26 to be used as coolant again. On the other hand, part of the saturated water vapor is carried to the high-pressure turbine 30 through the power generation water vapor line 22 and other part of the saturated water vapor is carried to the water vapor superheaters 34, 44 through the superheating water vapor lines 24. A ratio between the power generation water vapor and the superheating water vapor is not restricted to any particular value because it changes depending on the number and performance of the turbines. However, the ratio is preferred to be 45 to 65 parts by weight with respect to 100 parts by weight of the power generation water vapor.

By inflating the saturated water vapor in the high-pressure turbine 30, the turbine is driven with its kinetic energy to generate electric power. Because the water vapor used in power generation by the high-pressure turbine 30 is in a supersaturated condition with a reduced pressure, the water vapor is superheated with the superheater 34 through the power generation water vapor line 32 to turn into a saturated or lower state and then is supplied to the medium-pressure turbine 40.

By inflating the saturated water vapor in the medium-pressure turbine 40 also, the turbine is driven with its kinetic energy to generate electric power. The supersaturated water vapor used in power generation in the medium-pressure turbine 40 is superheated by the superheater 44 through the power generation water vapor line 42 to turn into a saturated or lower state, and supplied to the low-pressure turbine 50. Generation of electric power is carried out in the medium-pressure turbine 50 also.

The water vapor used in power generation by the low-pressure turbine 50 is collected by the water vapor collection line 52 and condensed by the condenser 54. The condensed coolant is carried to the condenser 60 by a pump 56. The superheating water vapor, which has undergone heat exchange with the power generation water vapor in the superheaters 34, 44, is carried to the condenser 60 through the superheating water vapor lines 24A, 24B and condensed there. Then, the condensed coolant in the condenser 60 is returned to the steam-water separator 20 through the coolant collection line 62 and a pump 64, and used for cooling of the reactor 10 again.

Figure 2:
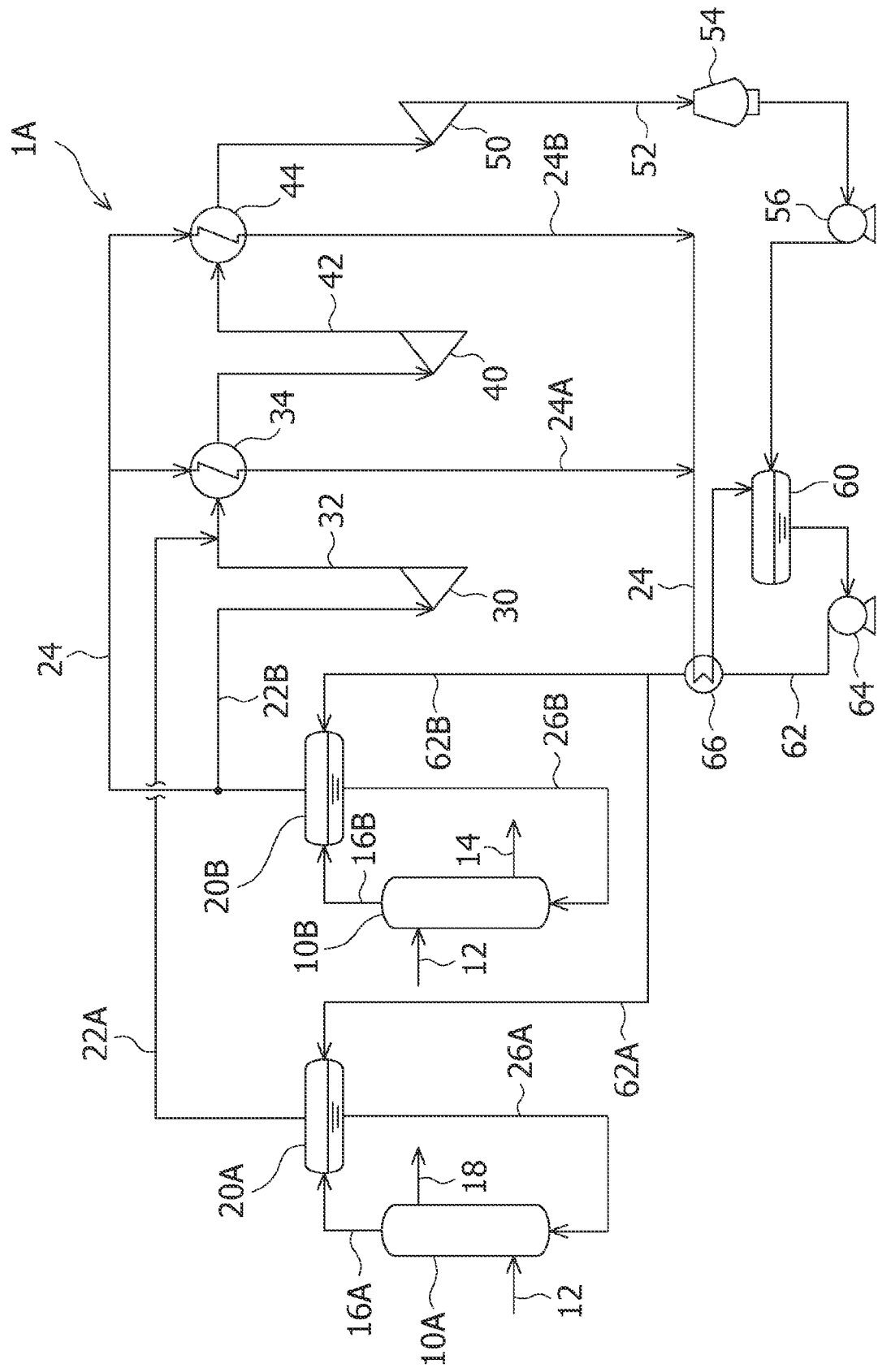
FIG. 2 is a schematic view showing another embodiment of a system for generating electric power and for producing gasoline according to the present invention.

The embodiment shown in FIG. 1 indicates a case of providing the reactor 10, which synthesizes gasoline from methanol by executing the two reactions based on formulas 1 and 2. However, as shown in FIG. 2, together with a gasoline reactor 10B for synthesizing gasoline, it is permissible to provide a dimethyl ether (DME) reactor 10A for obtaining dimethyl ether through only the reaction of formula 1. Consequently, the DME can be produced as well as gasoline. The DME is available as a fuel alternate to liquid petroleum gas (LPG).

In this case, as shown in FIG. 2, the DME reactor 10A and the gasoline reactor 10B are provided with steam-water separators 20A, 20B and coolant circulation lines 26A, 26B, respectively. A power generation water vapor line 22B from the gasoline reactor 10B is extended up to the high-pressure turbine 30, and a power generation water vapor line 22A from the DME reactor 10A is extended up to a power generation water vapor line located between the high-pressure turbine 30 and the medium-pressure turbine 40. Because, as described above, the reaction temperature and the reaction heat are lower in the DME synthetic reaction than in the gasoline synthetic reaction, supplying the water vapor used for cooling the DME reactor 10A to the medium-pressure turbine 40 enables thermal energy to be recovered more effectively.

Further, as shown in FIG. 2, a heat exchanger 66 may be provided on a downstream side of the superheaters 34, 44 in the superheating water vapor lines 24A, 24B. In the heat exchanger 66, the condensed coolant flowing through the coolant collection line 62 is heated by the superheating water vapor superheated by the superheaters. Consequently, the entire thermal efficiency can be increased by preheating coolants in the coolant collection lines 62A, 62B.

Although in the embodiment shown in FIG. 1, the DME synthetic reaction and the gasoline synthetic reaction for producing gasoline from methanol are executed with the single reactor 10, these reactions may be carried out with independent reactors each. In this case, a line for supplying DME is provided between the DME reactor which carries out the DME synthetic reaction shown in formula 1 mentioned above and the gasoline reactor which carries out the gasoline synthetic reaction shown in formula 2 mentioned above.

Although the gasoline production power generation system of the present invention may be built at a place of production of methanol, which is a raw material, or a place of production of natural gas, which is a raw material for methanol, it is preferred to be built at a consumption place of gasoline or nearby places. Because methanol remains in a liquid state at a normal temperature and normal pressure, and is easy to handle, transportation of the methanol to a consumption area of gasoline or nearby areas, for example, metropolitan area after the methanol is produced at a production place of natural gas such as Middle Eastern area enables transportation cost to be reduced largely compared to transportation of natural gas in a liquefied state. Further, because the consumption place of gasoline usually has a high demand for electric power, electric power can be supplied effectively to users by generating the electric power at the consumption place of gasoline or nearby areas.

Example

A simulation about power generation efficiency was carried out on a system shown in FIG. 1. Table 1 and FIG. 3 show a result thereof. In the meantime, the reactor 10 was cooled under a condition of using water as coolant and cooling in calorific value of $80.9 \times 10^6$ kcal/h and another condition that an obtained water vapor was at 100 ata and 310° C. Further, as a predetermined condition, this saturated water vapor was supplied to the high-pressure turbine 30 by 100 ton/h for the purpose of power generation and by 54.6 ton/h for the purpose of superheating. Of this amount of the water vapor, 22.4 ton/h ($7.3 \times 10^6$ kcal/h as converted to calorific value) was supplied to the superheater 34 and 32.2 ton/h was supplied to the superheater 44. Air discharged from the low-pressure turbine 50 was set to 0.05 ata.

TABLE 1

| | Enthalpy of steam (kcal/kg) |
|---|---|
| Power generation water vapor line 22, Superheating water vapor line 24 | 660 |
| Power generation water vapor line 32 (before superheating) | 630 |
| Power generation water vapor line 32 (after superheating) | 730 |
| Power generation water vapor line 42 (before superheating) | 605 |
| Power generation water vapor line 42 (after superheating) | 710 |
| Water vapor collection line 52 (before condensation) | 585 |
| Water vapor collection line 52 (after condensation) | 30 |
| Superheating water vapor line 24A (after superheating) | 334 |
| Superheating water vapor line 24B (after superheating) | 334 |

FIG. 3 illustrates a plotting of the result of Table 1 on an h-s diagram for steam. As shown in FIG. 3, electric power could be generated with thermal energy possessed by the coolant effectively by adopting a three-stage system comprised of the high-pressure turbine 30, the medium-pressure turbine 40, and the low-pressure turbine 50. Of course, a two-stage system comprised of the high-pressure turbine and the low-pressure turbine may be adopted or a system with four or more stages may be adopted.

As a result, electric power generated by the high-pressure turbine 30 was 3,488 kw, electric power generated by the medium-pressure turbine 40 was 11,395 kw, and electric power generated by the low-pressure turbine 50 was 14,535 kw. The total output was 29,418 kw. Because input heat was $80.9 \times 10^6$ kcal/h, a steam efficiency of 31.3% could be attained.

Table 2 shows a result of the simulation about power generation efficiency on the system shown in FIG. 2. The DME reactor 10A was cooled in calorific value of $98.0 \times 10^6$ kcal/h, and the gasoline reactor 10B was cooled in calorific value of $122.4 \times 10^6$ kcal/h. Under such conditions, the DME reactor 10A can obtain water vapor of 30 ata and 233° C., and the gasoline reactor 10B can obtain water vapor of 100 ata and 310° C. As another predetermined condition, saturated water vapor of 188.4 ton/h for power generation was supplied from the DME reactor 10A, and saturated water vapor of 100 ton/h for power generation was supplied from the gasoline reactor 10B. Further, the saturated water vapor for superheating was supplied from the gasoline reactor 10B by 133.8 ton/h, while 42.2 ton/h ($13.8 \times 10^6$ kcal/h as converted to calorific value) was supplied to the superheater 34 and 91.6 ton/h ($29.9 \times 10^6$ kcal/h as converted to calorific value) was supplied to the superheater 44. Air discharged from the low-pressure turbine 50 was set to 0.05 ata. Calorific value in the heat exchanger 66 was set to $17.6 \times 10^6$ kcal/h.

TABLE 2

|  | Enthalpy of steam (kcal/kg) |
|---|---|
| Power generation water vapor line 22A | 668 |
| Power generation water vapor line 22B, Superheating water vapor line 24 | 660 |
| Power generation water vapor line 32 (before superheating) | 630 |
| Power generation water vapor line 32 (after superheating) | 703 |
| Power generation water vapor line 42 (before superheating) | 605 |
| Power generation water vapor line 42 (after superheating) | 710 |
| Water vapor collection line 52 (before condensation) | 585 |
| Water vapor collection line 52 (after condensation) | 30 |
| Superheating water vapor line 24A (after superheating) | 334 |
| Superheating water vapor line 24B (after superheating) | 334 |
| Superheating water vapor lien 24 (after heat exchange) | 60.9 |
| Coolant collection line 62 (before heat exchange) | 40.9 |
| Coolant collection line 62 (after heat exchange) | 136.5 |

In the system shown in FIG. 2, electric power generated by the high-pressure turbine 30 was 3,488 kw, electric power generated by the medium-pressure turbine 40 was 32,400 kw, electric power generated by the low-pressure turbine 50 was 41,340 kw, and a total output was 77,228 kw. Because total input heat was $220.4 \times 10^6$ kcal/h, steam efficiency of 30.1% could be attained.

What is claimed is:

1. A method for generating electric power and for producing gasoline from methanol by combination of a plurality of steam turbines in series, a catalyst layer for synthesizing the gasoline from the methanol, and a flow path of a coolant located outside of the catalyst layer to cool the catalyst layer by the coolant, the method comprising the steps of:

synthesizing the gasoline by reacting the methanol in the catalyst layer;

recovering heat generated from a gasoline synthetic reaction of the methanol by running water as the coolant through the flow path to obtain supersaturated steam from vaporization of the water;

separating the supersaturated steam into the water and saturated water vapor;

generating the electric power with a first steam turbine of the plurality of steam turbines using a part of the saturated water vapor;

superheating supersaturated exhaust steam from the first steam turbine of the plurality of steam turbines by another part of the saturated water vapor to turn the exhaust steam into a saturated state or lower; and generating the electric power with a second steam turbine of the plurality of steam turbines using superheated exhaust steam.

2. The method according to claim 1, wherein the plurality of steam turbines comprises a high-pressure turbine, a medium-pressure turbine, and a low-pressure turbine, the method comprising:

generating the electric power with the high-pressure turbine using a part of the saturated water vapor;

superheating the supersaturated exhaust steam from the high-pressure turbine by another part of the saturated water vapor to turn the exhaust steam into the saturated state or lower;

generating the electric power with the middle-pressure turbine using the superheated exhaust steam from the high-pressure turbine;

superheating the supersaturated exhaust steam from the middle-pressure turbine by still another part of the saturated water vapor to turn the exhaust steam into the saturated state or lower; and generating the electric power with the low-pressure turbine using the superheated exhaust steam from the middle-pressure turbine.

* * * * *